US010992674B2

(12) United States Patent
Van De Velde et al.

(10) Patent No.: US 10,992,674 B2
(45) Date of Patent: Apr. 27, 2021

(54) METHOD AND APPARATUS FOR PROVIDING NETWORK ACCESS TO A USER ENTITY

(75) Inventors: Thierry Van De Velde, Meise (BE); Wim Henderickx, Westerlo (BE); Telemaco Melia, Rolle (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/124,413

(22) PCT Filed: Jun. 4, 2012

(86) PCT No.: PCT/EP2012/060473
§ 371 (c)(1),
(2), (4) Date: Apr. 3, 2014

(87) PCT Pub. No.: WO2012/168173
PCT Pub. Date: Dec. 13, 2012

(65) Prior Publication Data
US 2014/0223538 A1  Aug. 7, 2014

(30) Foreign Application Priority Data

Jun. 8, 2011 (EP) .................................. 1290264

(51) Int. Cl.
*H04L 29/00* (2006.01)
*H04L 29/06* (2006.01)
(Continued)

(52) U.S. Cl.
CPC ...... *H04L 63/0892* (2013.01); *H04L 12/2867* (2013.01); *H04L 12/4633* (2013.01);
(Continued)

(58) Field of Classification Search
CPC .................................................... G06F 21/20
(Continued)

(56) References Cited

U.S. PATENT DOCUMENTS 6,636,491 B1    10/2003  Kari et al.
7,136,651 B2 *  11/2006  Kalavade .................. 455/445
(Continued)

FOREIGN PATENT DOCUMENTS

CN    1256053 A    6/2000
CN    1476205 A    2/2004
(Continued)

OTHER PUBLICATIONS

"Lazio Bokor, Zoltan Kanizsai, Gabor Jeney"/ Performance Evaluation of Key IMS Operations over IPv6-capable 3G UMTS networks/ 2010/2010 Ninth International Conference on Networks/pp. 262-271 (Year: 2010).*

(Continued)

*Primary Examiner* — Christopher C Harris
*Assistant Examiner* — Michael D Anderson
(74) *Attorney, Agent, or Firm* — Fay Sharpe LLP

(57) ABSTRACT

A method for providing network access to a plurality of user entities through an access point, said access point comprising a LAN interface and a broadband network interface, the method comprising the following steps at a gateway device: establishing a second secure communication link with said access point; receiving an IP address allocation request from one of said plurality of user entities via said second secure communication link; accessing a AAA server to verify whether a successful authentication of said one of said plurality of user entities on the basis of data related to a mobile subscription associated with said one of said plurality of user entities has already taken place; and upon successful verification, completing an IP address allocation scheme with said one of said plurality of user entities and enabling relaying of data between said one of said plurality of user entities and a PDN; wherein said gateway device is adapted to aggregate a plurality of instances of second (Continued)

secure communication links from different access points towards said PDN.

13 Claims, 6 Drawing Sheets

(51) Int. Cl.
  *H04L 12/46* (2006.01)
  *H04L 12/28* (2006.01)
(52) U.S. Cl.
  CPC .......... *H04L 63/0428* (2013.01); *H04L 63/08* (2013.01); *H04L 63/162* (2013.01)
(58) Field of Classification Search
  USPC ...................................... 726/4, 12
  See application file for complete search history.

(56) References Cited

U.S. PATENT DOCUMENTS

| | | | |
|---|---|---|---|
| 8,423,760 B2* | 4/2013 | Kant | H04L 63/0471 |
| | | | 709/223 |
| 8,464,321 B2 | 6/2013 | Zhou et al. | |
| 8,615,017 B2 | 12/2013 | Kato et al. | |
| 2008/0310358 A1* | 12/2008 | Shaheen | H04W 48/14 |
| | | | 370/329 |
| 2009/0043902 A1* | 2/2009 | Faccin | H04W 76/02 |
| | | | 709/229 |
| 2009/0047966 A1 | 2/2009 | Krishnaswamy et al. | |
| 2011/0090815 A1 | 4/2011 | Gundavelli et al. | |
| 2011/0173678 A1* | 7/2011 | Kaippallimalil et al. | 726/4 |

FOREIGN PATENT DOCUMENTS

| | | |
|---|---|---|
| CN | 101141822 A | 3/2008 |
| CN | 101155126 A | 4/2008 |
| CN | 101779479 A | 7/2010 |
| EP | 1 871 065 A1 | 12/2007 |
| EP | 2 034 779 A1 | 3/2009 |
| JP | 2011-023796 A | 2/2011 |
| JP | 2012-515479 A | 7/2012 |
| KR | 10-2009-0036562 | 4/2009 |
| KR | 10-2010-0056530 | 5/2010 |
| KR | 10-2010-0093611 | 8/2010 |
| WO | WO 2007/148969 A1 | 12/2007 |
| WO | WO 2009/026007 A1 | 2/2009 |
| WO | WO 2010/043254 A1 | 4/2010 |

OTHER PUBLICATIONS

International Search Report for PCT/EP2012/060473 dated Oct. 22, 2012.
Ericsson, ST-Ericsson, ZTE, Functional description for GTP based S2a, 3GPP TSG-SA WG2, Meeting #84, TD S2-1114343, Apr. 11-15, 2011, 2 pages, Bratislava, Slovakia.
Ericsson, ST-Ericsson, ZTE, Alcatel-Lucent, SaMOG S2a GTP HO procedure, 3GPP TSG SA WG2 Meeting #85, TD S2-112733, May 16-20, 2011, pp. 1-4, Xl'an, P.R. China.
3rd Generation Partnership Project; Technical Specification Group Services and System Aspects; Study on S2a Mobility based on GTP & WLAN access to EPC (SaMOG); Stage 2 (Release 11), 3GPP TR 23.852, May 2011, V0.2.0. pp. 1-26.
Ericsson, ST-Ericsson, ZTE, Alcatel-Lucent, Functional description for GTP based S2a, 3GPP TSG-SA WG2 meeting #85, TD S2-112269, May 16-20, 2011, 2 pages, Xl'an, P.R. China.

* cited by examiner

METHOD AND APPARATUS FOR PROVIDING NETWORK ACCESS TO A USER ENTITY

FIELD OF THE INVENTION

The present invention pertains to the field of access networks, in particular the field of service-level integration of cellular and non-cellular access networks.

BACKGROUND

Certain modern handheld electronic devices (further referred to as "User Entities" or "UE") comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

So far, a satisfactory protocol architecture is lacking that would enable operators to provide broadband services (connectivity and value-added services) to mobile customers when they are communicating via the non-cellular network.

For example, architectures specified by the 3$^{rd}$ Generation Partnership Project (3GPP) require a secure connection ("thin pipe") to be set up between the UE and either an evolved Packet Data Gateway (ePDG) or a Packet Data Network Gateway (PDN Gateway), if the IP CAN is untrusted from the Mobile Network Operator (MNO) perspective.

SUMMARY OF THE INVENTION

It is an object of embodiments of the present invention to overcome the aforementioned shortcomings.

According to an aspect of the present invention, there is provided a method for providing network access to a plurality of user entities through an access point, said access point comprising a LAN interface and a broadband network interface, the method comprising the following steps at a gateway device: establishing a second secure communication link with said access point; receiving an IP address allocation request from one of said plurality of user entities via said second secure communication link; accessing a AAA server to verify whether a successful authentication of said one of said plurality of user entities on the basis of data related to a mobile subscription associated with said one of said plurality of user entities has already taken place; and upon successful verification, completing an IP address allocation scheme with said one of said plurality of user entities and enabling relaying of data between said one of said plurality of user entities and a PDN; wherein said gateway device is adapted to aggregate a plurality of instances of second secure communication links from different access points towards said PDN.

According to an aspect of the present invention, there is provided a method for providing network access to a plurality of user entities through an access point, said access point comprising a LAN interface and a broadband network interface, the method comprising the following steps at said wireless access point: establishing a respective first secure communication link with each user entity from among said plurality of user entities via said LAN interface; establishing a second secure communication link with a gateway device via said broadband network interface; and bidirectionally relaying data between a respective first secure communication link and said second secure communication link; wherein said gateway device is adapted to aggregate a plurality of instances of second secure communication links from different access points towards a PDN gateway.

The present invention provides a way to "offload" certain data traffic from the cellular radio access network into a non-cellular IP CAN, which, for the purposes of this disclosure, will also be generically referred to as a "LAN". This presents benefits to mobile network operators and end users who utilize a user entity capable of operating both on the cellular net and on non-cellular IP CAN such as Wi-Fi. The cost per bit in the macro-cellular infrastructure is significantly higher than for the offloaded traffic. This is not only the case for the infrastructural investment cost, but also for operational expenses as location, power and even the fixed backhaul for Wi-Fi will typically not be borne by the MNO. Furthermore it allows the mobile operator to charge for this offloaded traffic, creating new revenue opportunities.

In an embodiment of the method of the present invention, the access point is a wireless access point, and the LAN interface is a wireless LAN interface, the wireless transmissions of which are secured by means of an IEEE 802.11i encryption protocol.

This embodiment has the advantage of requiring less general-purpose processing power at the user entity and in the network gateway (ePDG/PGW) than known end-to-end IPSec models.

In an embodiment of the method of the present invention, the second secure communication link is secured by means of an IPSec transport tunnel.

This embodiment has the advantage of providing good security between the access point and the gateway device, at reasonable cost and complexity, thus avoiding the risk of snooping at devices between the access point and the operator network (e.g., at a residential gateway) requiring less general-purpose processing power at the user entity than known end-to-end IPSec models.

In an embodiment, the method of the present invention further comprises at the access point: receiving via the LAN interface a request from a user equipment to authorize communication with a network attached to the broadband network interface; obtaining data related to a mobile subscription associated with the user equipment from a home location register; authenticating the user equipment on the basis of the data related to the mobile subscription; and authorizing the communication with the network attached to the broadband network interface if the authenticating is successful.

In a particular embodiment, the authenticating of the user equipment comprises: transmitting at least one authentication challenge to the user equipment via the LAN interface, and receiving a response to the at least one authentication challenge from the user equipment via the LAN interface, the response being cryptographically derived from the at least one authentication challenge by means of a key which is securely stored at the user equipment.

In a more particular embodiment, the key is stored in a SIM card.

A "SIM card" is understood to designate a Subscriber Identity Module as standardized in the GSM and UMTS specifications. The EAP-SIM/AKA authentication allows for a unified subscription and subscriber database for both mobile (3G-LTE) access and for Wi-Fi offload. The re-use of the EAP-SIM/AKA authentication by the converged operator to identify and authenticate the user entity, typically a "smartphone", allows that operator to maintain ownership of the Wi-Fi offload session to the mutual benefit of both the operator and the end-user. This clearly has significant benefits for the mobile network operator (MNO). It allows the MNO to offload significant traffic from its macro layer radio access network (RAN), freeing up resources and delaying required investment in capacity expansion, while at the same time maintaining the full relationship with the end-user, improving the brand loyalty. For the end-user, the main advantage is the seamless access to all networks supported by the MNO, in particular Wi-Fi networks. This will greatly increase the number of locations where the end-user takes advantage of the available Wi-Fi resources.

In a particular embodiment, the user entity comprises an IEEE 802.1X supplicant, and wherein the authorizing of the communication comprises transitioning a port of the access point to an IEEE 802.1X authorized state.

In an embodiment of the method of the present invention, the gateway device comprises one of a AAA server, a AAA proxy, and a AAA sniffer, to instantiate and remove user entity sessions.

In an embodiment of the method of the present invention, the gateway device sets up a GTP tunnel to a GGSN or PDN gateway, to provide the user entity with access to mobile operator IP services and/or charging mechanisms. The user entity address may in that case be granted by the GGSN or PDN Gateway.

In another embodiment of the method of the present invention, the gateway device contains a Mobile IP (MIP, Dual Stack MIP v6) Foreign Agent, registering the UE to a Home Agent.

According to an aspect of the present invention, there is provided a computer program configured to cause a programmable machine to carry out the method described above in both the WAP/CPE or in the gateway device.

According to an aspect of the present invention, there is provided an access point for use in the method described above.

According to an aspect of the present invention, there is provided a gateway device for use in the method described above.

The advantages of the program, access point, and gateway device according to the present invention correspond, mutatis mutandis, to those of the methods according to the invention.

BRIEF DESCRIPTION OF THE FIGURES

Some embodiments of apparatus and/or methods in accordance with embodiments of the present invention are now described, by way of example only, and with reference to the accompanying drawings, in which.

Throughout the figures, the same reference signs have been used to designate the same elements.

DETAILED DESCRIPTION OF EMBODIMENTS

Throughout the following description, the following generalizations hold. Where any particular number of instances of a particular element are shown and/or described, this is done for clarifying purposes only and without loss of generality. Where steps in a method are shown and/or described in a particular order, this is done for clarifying purposes only and without loss of generality; the order of the steps may be changed and/or parallelized without departing from the scope of the present invention, unless it is clear from the description that a particular order of steps is necessary to obtain the associated technical outcome. Where reference is made to a particular standard, it is to be understood that other, functionally equivalent standards may be substituted. Features and benefits described in association with a method according to the invention apply mutatis mutandis to the apparatus according to the invention, and vice versa.

Figure 1:
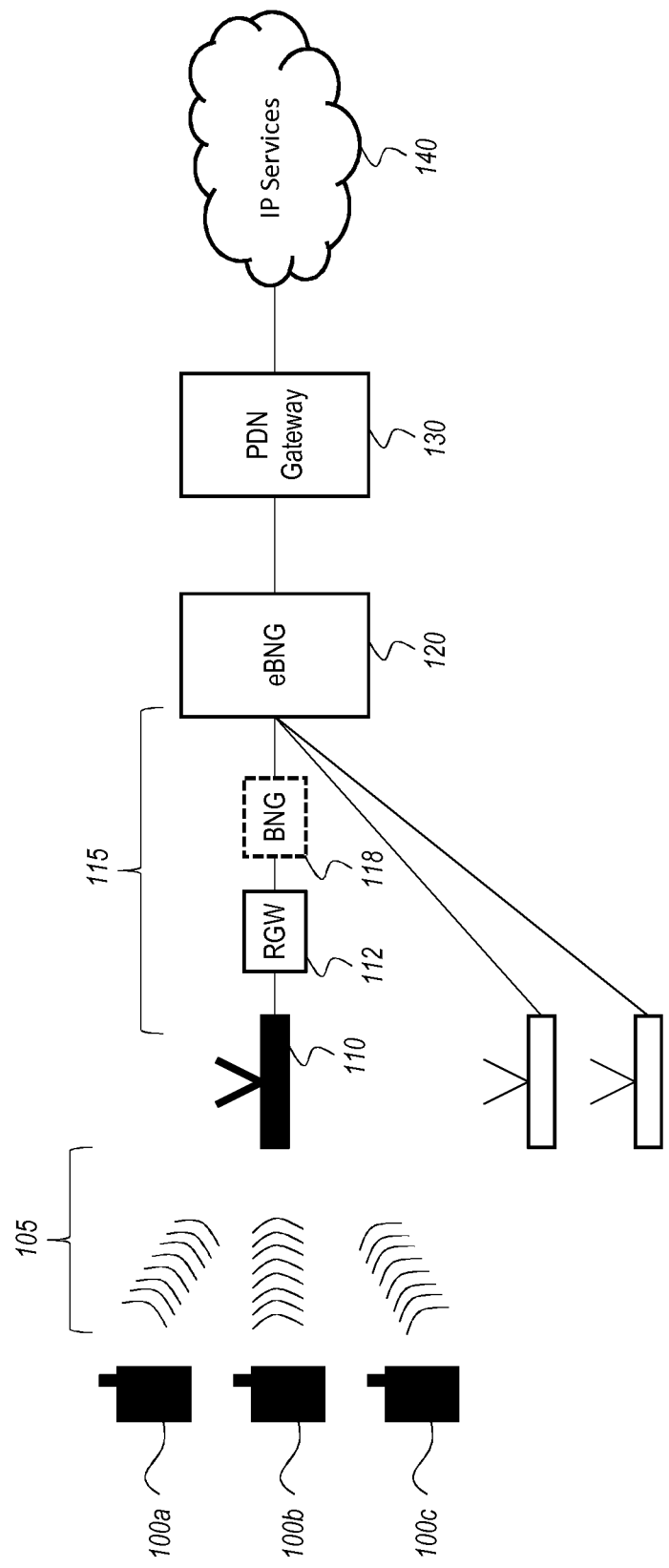
FIG. 1 illustrates a simple exemplary network topology in which embodiments of the method of the present invention may be deployed.

FIG. 1 illustrates an extremely simplified exemplary network topology, in which embodiments of the present invention may be deployed. It is a purpose of embodiments of the present invention to provide network access to a plurality of user entities 100a-c through an access point 110. User entities 100a-c are assumed to be devices capable of communicating over a cellular network (for example: 2G, 2.5G, 3G, LTE) and over a LAN network such as a wireless LAN network (for example: IEEE 802.11a/b/g/n).

Without loss of generality, a wireless LAN network is assumed as the LAN network in the remainder of the description. The skilled person will appreciate that the invention applies in a completely analogous way to wired LAN networks.

When the user entities 100a-c are within the range of a wireless LAN network, such as the one serviced by wireless access point 110, it is preferable both from the economical point of view and as a matter of bandwidth availability to conduct high-volume data communications, including for example internet-based television and/or video calls, via the wireless LAN interface rather than via the cellular interface. Moving intended communications away from the cellular radio access network (RAN) and into a wireless LAN access network, provides a form of "off-loading" for the former; hence, the deployment model introduced by embodiments of the present invention will be referred to as "WiFi Offloading".

For this purpose, the wireless access point 110 allows the establishment of first secure communication links 105 over the wireless LAN interface. These communication links 105 are secure in the sense that they are covered by a form of encryption between each respective user entity 100a-c and the access point 110, preferably a form of encryption as standardized in the IEEE 802.11i framework (e.g.: WPA, WPA2). Where a wired access point is used, the security may be provided by the physical point-to-point nature of the medium (e.g. IEEE 802.3 Ethernet over twisted pair or point-to-point fiber).

In contrast to prior art architectures, such as those proposed in the 3GPP framework, the wireless access point 110 according to the present invention establishes a second secure and/or encapsulated communication link 115 with a gateway device 120, hereinafter also referred to as an evolved Broadband Network Gateway (eBNG). The second secure communication link 115 is secure in the sense that it is encrypted and/or encapsulated. This link 115 may be covered by a form of encryption between the wireless access point 110 and the eBNG 120, preferably a form of encryption as standardized in the IPSec framework. This link 115 may additionally or alternatively be encapsulated in the sense that the wireless access point 110 and the eBNG 120 encapsulate each uplink resp. downlink IP packet into a new IP packet carrying the GRE, L2TP, MPLS, VLAN tagging or other encapsulation protocol. The second communication link 115 is physically carried by any suitable network, which may consist of several wired (e.g. Ethernet, xDSL, GPON) and/or wireless (e.g. IEEE 802.16) network segments. Additional network equipment such as a residential gateway 112 may be present in this part of the network.

The second secure communication link 115 conveys the traffic of multiple user entity sessions, and can therefore be designated as a "fat pipe", in contrast to so-called "thin pipes", which only carry a single UE-initiated session. The network and protocol architecture according to the present invention will also be referred to as a "fat pipe model".

The eBNG 120 aggregates several of the aforementioned "fat pipes", some of which are illustrated in FIG. 1 as originating from different wireless access point instances (not numbered), and for each UE session optionally establishes a GTPv2 tunnel towards a PDN gateway 130. Through this PDN gateway 130, the user entities 100*a-c* can have the desired access to IP Services offered by or through the cellular network, symbolized by cloud 140 and shown in more detail in FIG. 5, in accordance with the terms of their subscription.

Terminating an IPSec tunnel from the access point 110 at the PDN Gateway 130 has several advantages. Firstly, it takes away the burden of terminating a provider-associated IPSec session from the user entities 100*a-c*, which can accordingly free up resources for other tasks, including for example running an end-to-end IPSec session with a correspondent such as a gateway of a corporate network. Secondly, as the access point 110 is generally capable of providing security over the wireless link, this device 110 is suited for providing back-to-back encryption, thus avoiding the presence of any unencrypted links in the end-to-end communication between the user entities 100*a-c* and the eBNG 120. This is particularly relevant when there is additional equipment, such as residential gateway 112, present between the end points, and generally accessible to unauthorized persons. In that case, the segment between access point 110 and residential gateway 112 could be left unprotected in the existing 3GPP architecture for offload to trusted IP CAN. The trusted IP CAN is indeed defined as the segment between RGW 112 and a Broadband Network Gateway (BNG) 118, located on the path between the RGW 112 and the eBNG 120.

Given the network and protocol architecture according to the present invention, it is an advantage that it becomes easy to implement a "Lawful Intercept" function at the gateway device 120, as it can re-use all existing fixed or mobile "Lawful Intercept" infrastructure (LI gateway). Similarly, thanks to the user session awareness at the gateway device 120, AAA, Online charging, offline charging, the Policy Control & Enforcement Function, Network Address Translation and other functions may be implemented at the gateway device 120.

Figure 2:
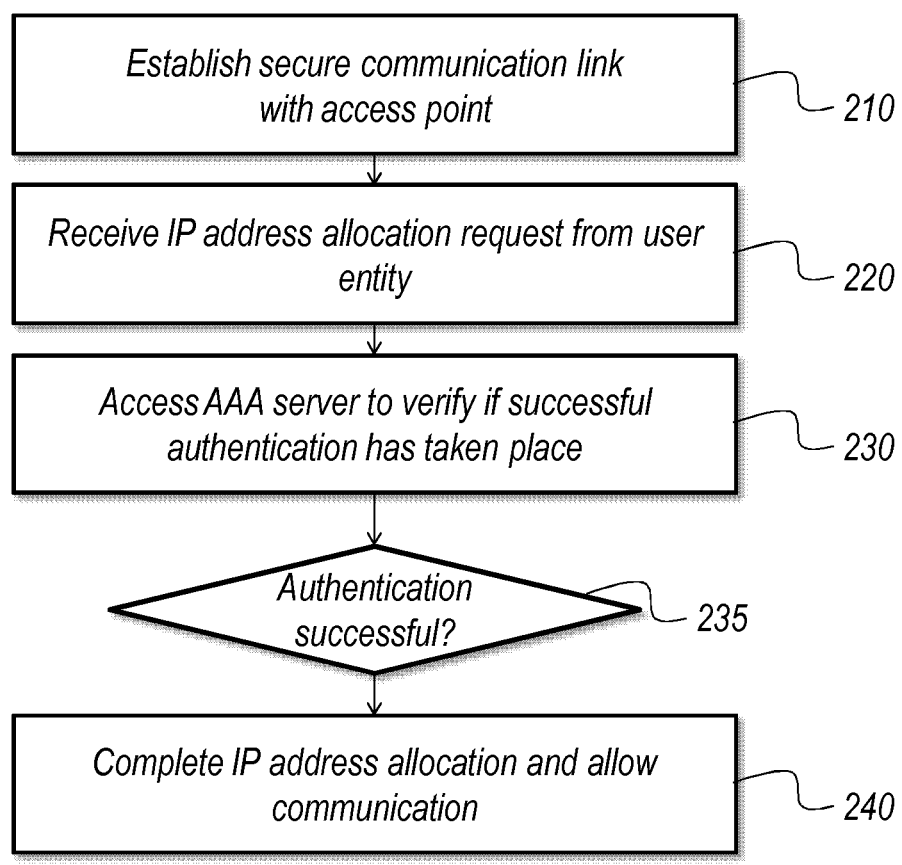
FIG. 2 represents a flow chart of an embodiment of the method of the present invention, in particular steps taken at a gateway device.

FIG. 2 represents a flow chart of an embodiment of the method of the present invention; in particular, it illustrates core activities of the gateway device 120 in the architecture of FIG. 1. In one step 210, the gateway device 120 establishes a secure communication link with the wireless access point 110. Layer-2 communication is set up between a user entity 100 and the wireless access point 110 in a way which will be described in more detail below, but which involves authentication of the user entity 100 on the basis of data related to a mobile subscription associated with that user entity 100. An AAA server 150 is involved in the authentication process. In one step 220, the gateway device 120 receives an IP address allocation request from the user entity 100 under consideration, typically a DHCP request. In one step 230, the gateway device 120 contacts the AAA server 150 to verify whether the aforementioned authentication has successfully taken place. If this is indeed the case 235, the gateway device 120 allows the IP address allocation to go forward, and establish communication between the user entity 100 and the provider's network infrastructure in the PDN gateway 130 in a step 240. Hence, the user entity 100 has to be authenticated only once, while both layer-2 and layer-3 connectivity are contingent on the outcome of that authentication. The authentication itself is based on the subscription held by the user of the user entity 100.

Figure 3:
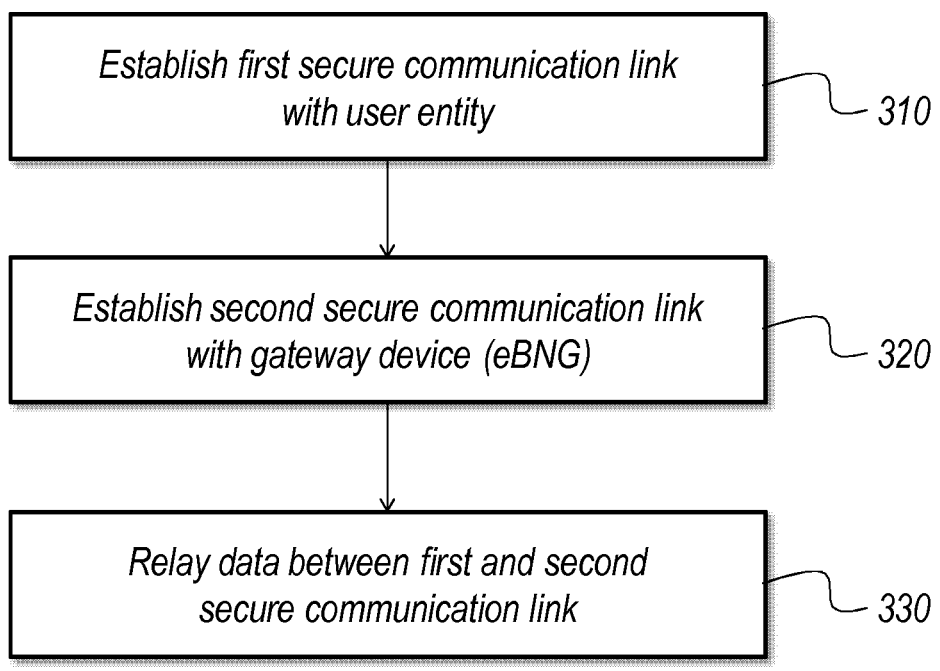
FIG. 3 represents a flow chart of an embodiment of the method of the present invention, in particular steps taken at an access point.

FIG. 3 represents a flow chart of an embodiment of the method of the present invention; in particular, it illustrates core activities of the wireless access point 110 in the architecture of FIG. 1. In one step 310, the wireless access point 110 establishes a first secure communication link 105 with a user entity 100, via the wireless network interface. In one step 320, the wireless access point 110 establishes a second secure and/or encapsulated communication link 115 with a gateway device 120. In one step 330, the wireless access point 110 relays data in both directions between the first secure communication link 105 and the second communication link 115, i.e. it allows communication between the user entity 100 and the gateway device 120.

Figure 4:
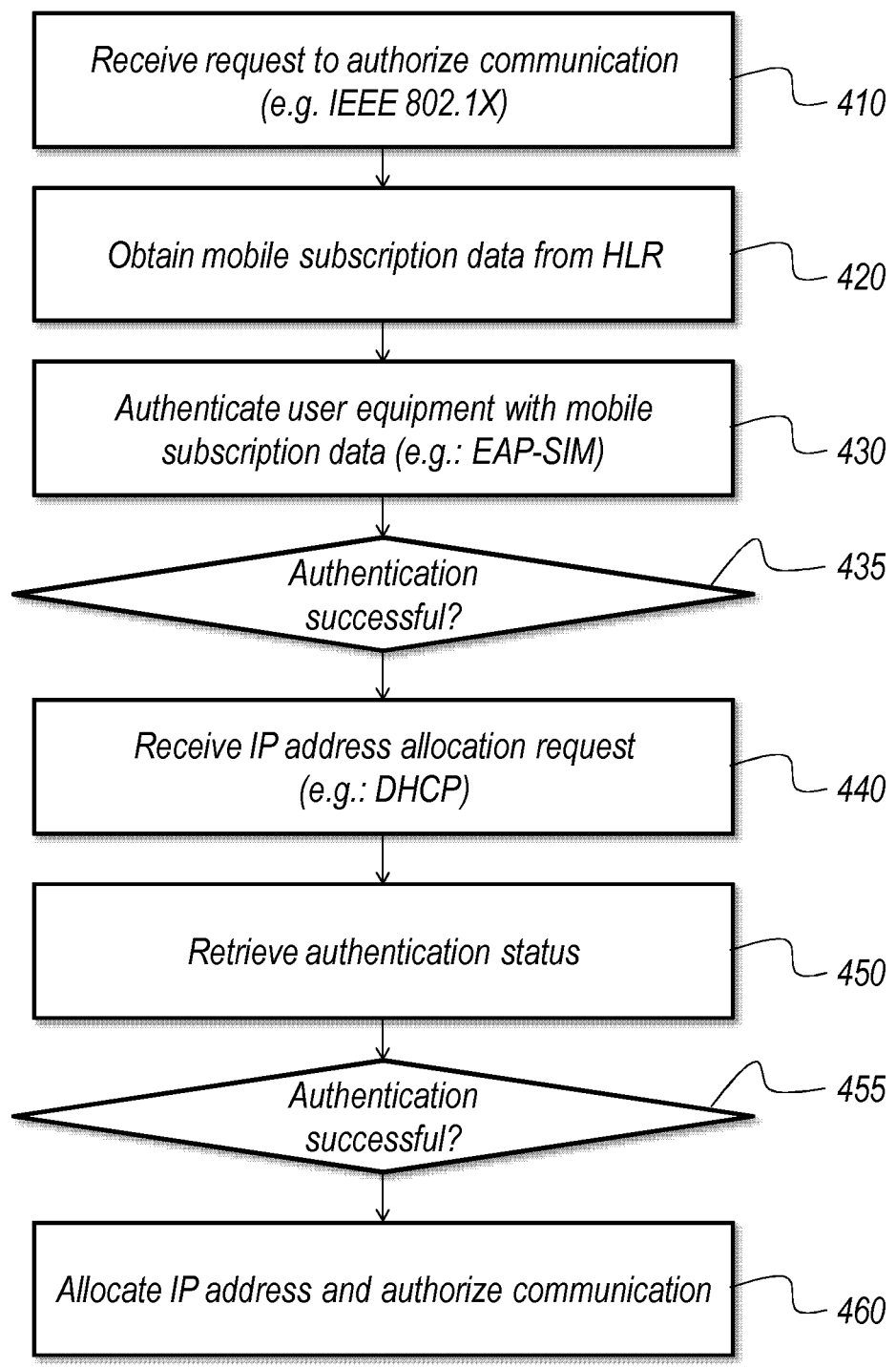
FIG. 4 represents a flow chart of certain steps in an embodiment of the method of the present invention.

In embodiments of the method according to the present invention, the establishment of communication between the user entity 110 and the gateway device 120 is contingent on successful authentication of the user entity 110, and limited by the terms of the subscription under which the user entity 110 operates. FIG. 4 represents a flow chart of certain steps in such an embodiment of the method of the present invention.

In one step 410 the wireless access point 110 receives a request from a user entity 100 to authorize communication. Preferably, the user entity 100 implements the IEEE 802.1X supplicant functionality for this purpose, and the request is dealt with as an IEEE 802.1X authorization request. The user entity's request in the sense of FIG. 4 need not be transmitted at the user entity's own initiative: it may in fact be an "EAP Response" message sent in reaction to an "EAP Request" message from the wireless access point 110.

In one step 420, the wireless access point 110 obtains mobile subscription data associated with the user entity 100 from the latter's home location register (HLR) 160. This information is typically not obtained directly, but indirectly via an authentication, authorization, and accounting (AAA) server 150, accessible via the gateway device 120, preferably using a RADIUS protocol exchange. It thus becomes possible to complete the authentication at the wireless access point 110 in a step 430 on the basis of subscriber information from the HLR 160. This method has the advantage of creating awareness of the user entity's subscriber details at the gateway device 120, enabling the deployment of subscription-specific services and/or subscription-based charging. It is a further advantage that the authentication step can be made highly secure, by using the user entity's SIM card in a challenge-response authentication exchange. The entire authentication sequence may advantageously be implemented as an EAP-SIM or EAP-AKA exchange.

Once the layer-2 communication has been set up, upon successful authentication 435, the layer-3 communication must be established 440-460. At this stage, the wireless access point 110 is already set up to allow layer-2 communication between the user entity 100 and the gateway device 120, such that the subsequent protocol exchanges take place between these entities. The layer-3 phase starts with a request for allocation of an IP address, received by the gateway device 120 in one step 440. In response to this request, the gateway device 120 retrieves the authentication status of the user entity 100 from the AAA server 150 in one step 450. If this status retrieval indicates that the authentication was successful 455, the IP address allocation request is accepted and an IP address is allocated in one step 460. The IP address allocation exchange preferably takes place according to the DHCP protocol, initiated by the UE.

Figure 5:
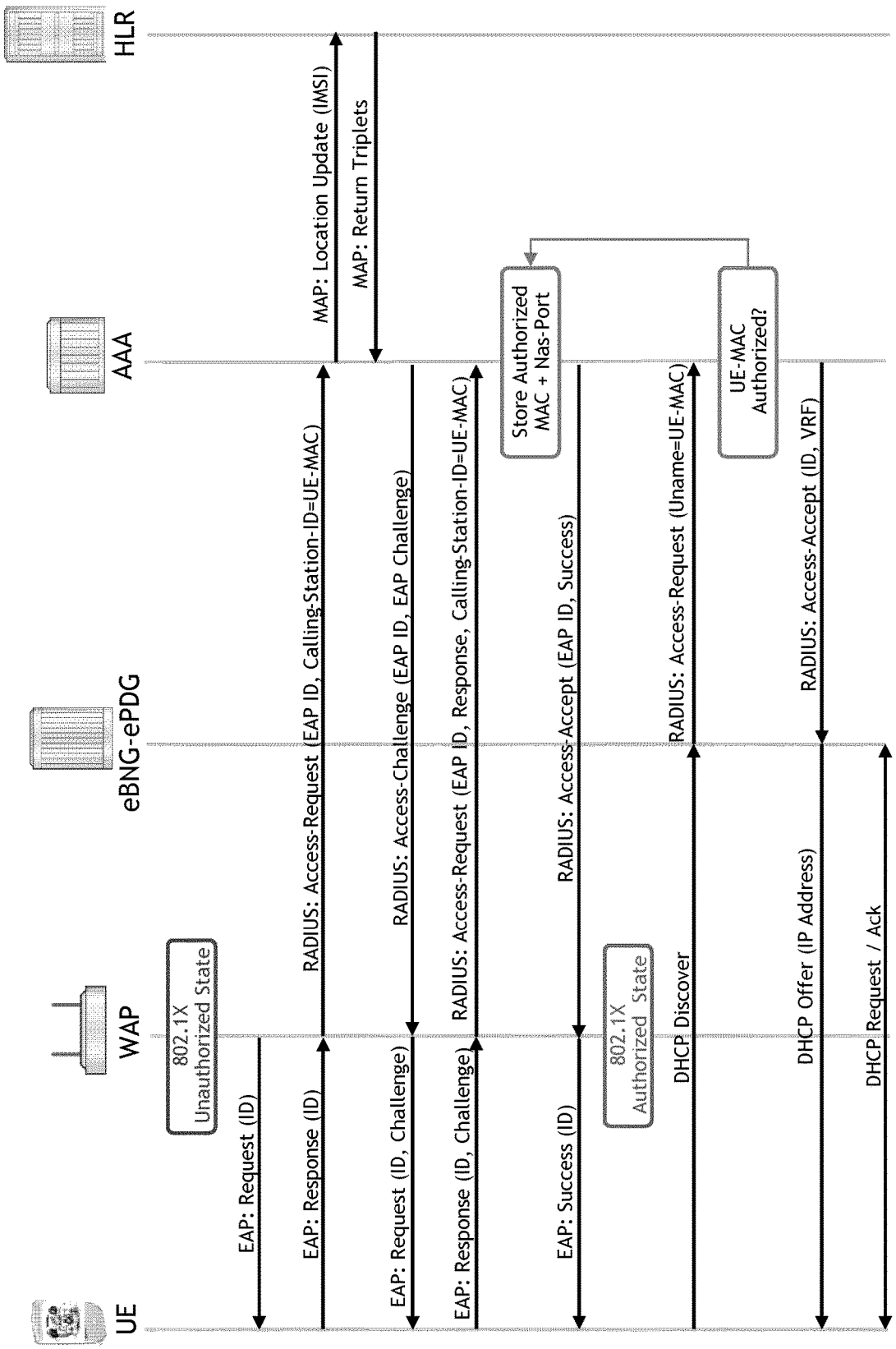
FIG. 5 schematically illustrates a detailed protocol message exchange for certain steps in an embodiment of the method of the present invention.

FIG. 5 schematically illustrates a detailed protocol message exchange according to an embodiment of the method of the present invention, corresponding to steps 410-460 of FIG. 4, as described in detail above.

Figure 6:
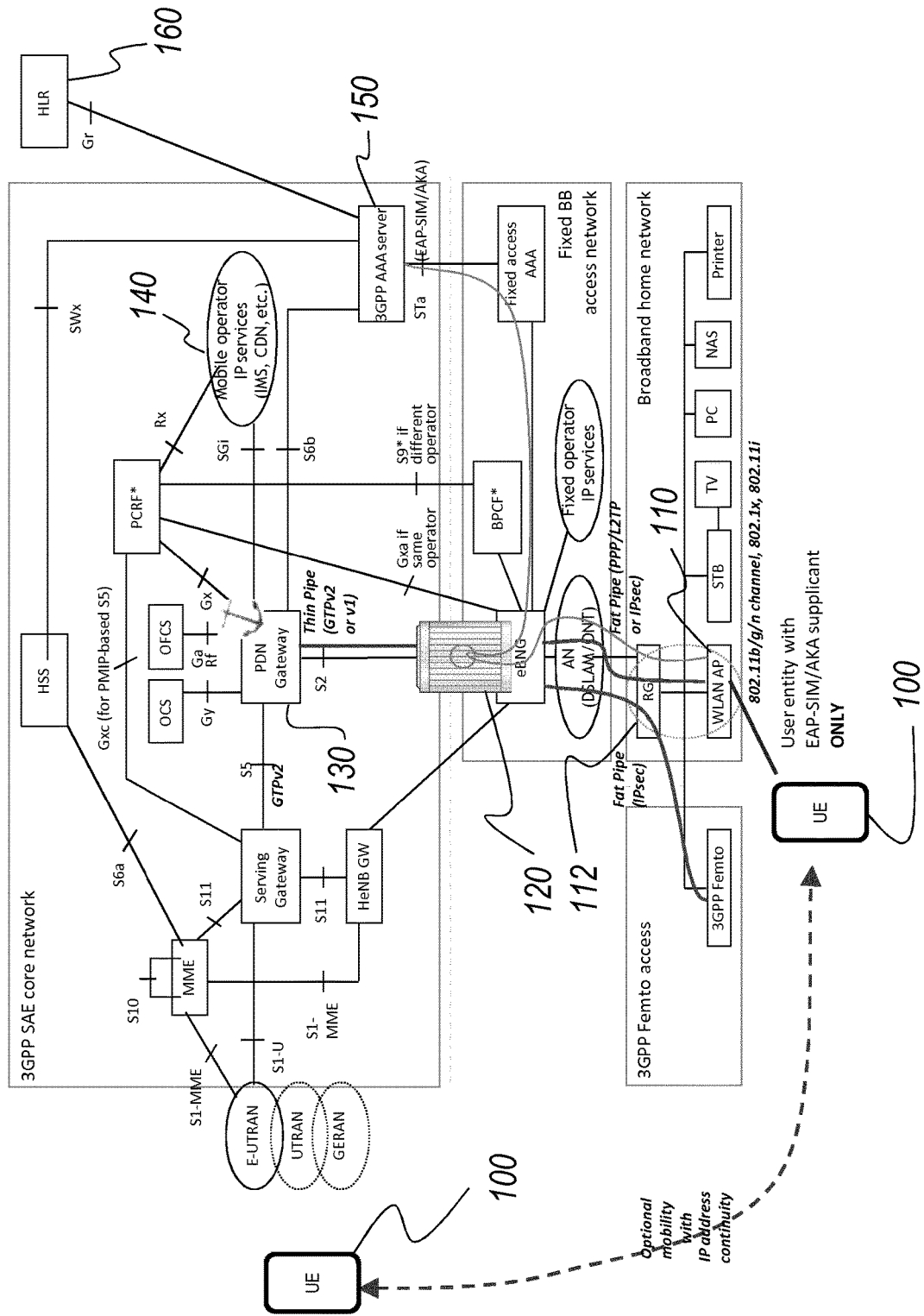
FIG. 6 represents a detailed exemplary network topology in which embodiments of the method of the present invention may be deployed.

FIG. 6 represents a detailed exemplary network topology in which embodiments of the method of the present invention may be deployed.

FIG. 6 in particular illustrates the interfaces of the gateway device 120. In addition to its specific function as evolved Broadband Network Gateway (eBNG) instantiating UE sessions across non-cellular IP CAN, the gateway device 120 may perform the functions of a traditional Broadband Network Gateway (BNG instantiating a session initiated by the CPE or RGW) and/or those of an evolved Packet Data Gateway (ePDG terminating UE-initiated IPSec SA), and it has the necessary structural components for this purpose. The gateway device 120 according to the present invention comprises an interface to interact with a wireless access point 110, typically via a fixed broadband access network, using a secure and/or encapsulated link, which represents a "fat pipe" as indicated above; an optional interface to interact with a PDN gateway, GGSN or HA 130; and an interface to interact with a AAA server 150, from which it may obtain subscription related information. The skilled person will appreciate that these interfaces need not be physically distinct, but that the necessary hardware and software must be present to properly distinguish communication to and from the respective correspondents at the network layer and above.

To further clarify the invention and its advantages, an exemplary implementation will now be described in more detail. The skilled person will appreciate that individual implementation options may be taken from this description and combined with the aforementioned general concepts of the invention without departing from the scope of the present disclosure.

When the smartphone 100 comes into a hotspot with a closed SSID, it will authenticate itself using its SIM/USIM credentials, avoiding the need for the user to set up any dedicated Wi-Fi account.

The SIM/USIM credentials are relayed via EAP-SIM/AKA methods and validated against the subscriber information in the HLR 160. As such these are the same mobile credentials (SIM/USIM) as used for the authentication and authorization within the 2G, 2.5G, 3G or LTE network.

The User entity 100, Wireless access point 110, and HLR 160 are assisted by an eBNG 120 and AAA server 150.

User Entity 100: All authentication mechanisms for Wi-Fi offload are supported today by commercial smartphones, 3G/Wi-Fi dongles and 3G/Wi-Fi enabled laptops.

Wireless Access Point 110: in order to receive Wi-Fi IEEE 802.11n certification, a Wireless Access Point needs to support EAP-SIM and/or EAP-AKA authentication. Further the Wireless Access Point needs to support a transport tunnel to the eBNG 120 in which to route all the offloaded traffic. This tunnel is by preference achieved as an IPsec or GRE tunnel.

eBNG 120: The eBNG needs to handle the DHCP session creation for the end-user behind the Wireless Access Point. The DHCP request info can be handed off with a RADIUS client to the AAA server 150, which associated this request to the previous EAP-SIM/AKA authentication for the same UE MAC Address. If the eBNG 120 supports a RADIUS proxy agent or sniffer for the EAP-SIM/AKA authentication phase, the eBNG 120 can look up a previous successful EAP-SIM/AKA authentication context for that UE MAC, and set up northbound communications (AAA, charging, PCC, LI, . . . ) based the UE identifiers (IMSI, MISDN, . . . ) discovered in the authentication phase. The eBNG 120 can apply offline/online charging on behalf of the mobile network operator, for example by selling a day pass of which a fraction will be kicked back to the mobile network operator.

AAA: The AAA server 150 supports the terminal EAP-SIM or EAP-AKA authentication and authorization through its MAP-based backend interface (Gr) towards the HLR 160: it performs the RADIUS EAP-to-MAP gateway function. When the second RADIUS request arrives from the eBNG RADIUS client for the session set-up, the AAA server 150 correlates the user entity's identity (UE-MAC address). If that UE was previously authorized, network access will be accepted and the session will be set up. The AAA server 150 can return the Charging-Profile-Id and MSISDN to the eBNG 120 to allow easy integration with charging and other northbound service platforms.

End-to-end security is achieved on a hop-by-hop basis. The air interface between the user entity 100 and the wireless access point 110 is secured with IEEE 802.11i. IEEE 802.11i keys (preferably for use with WPA2) can be derived from EAP-SIM/AKA ciphering keys.

The interface between the wireless access point 110 and eBNG 120 is secured with IPSec. From the eBNG 120 on, multiple options exist in function of the offered service. In accordance with the "fat pipe" model, as described above, a single IPsec tunnel between the wireless access point 110 and eBNG 120 carries the sessions of multiple end users.

The fat pipe model requires the user entity 100 to support 802.11i or equivalent ciphering in order to avoid spoofing. On the other hand, the fat pipe model does not require IPsec encryption on the user entity 100 and thus avoids the IPSec overhead, packet fragmentation and IKE keep-alive packets on the wireless LAN air interface. It is also compatible with corporate VPN access as it allows end-to-end encryption (the alternative "thin pipe model" would require double IPsec encryption by the user entity 100).

For the eBNG 120, the fat pipe model provides better scalability than the thin pipe model (ePDG or PDN Gateway), as each tunnel contains all the UE sessions active on that wireless access point 110.

The eBNG 120 can additionally deliver a set of managed services similar to the base service offering for mobile users.

This is done through instantiating the session in an enhanced subscriber management context based on the user profile. The Enhanced Subscriber Management (ESM) is a set of AAA, security and QoS features allowing automatic subscriber provisioning and per-subscriber QoS and security enforcement. The key aspect of the ESM feature set is that it provides a subscriber-aware model which is independent of access type (IP CAN), hence it can also be applied to Wi-Fi access.

The traffic is processed by the ESM engine before it is encapsulated in the IPsec ESP tunnel (or into a non-encrypted tunnel) towards the wireless access point. The ESM engine receives the user profile from the AAA server 150 in the final RADIUS access accept message. The user profile can contain a framed IP address, framed IP pool, VPRN identifier (Virtual Private Routing Network), a QoS profile, charging profile, DPI rulebase, NAT and security profile.

- QoS: The subscriber context allows the eBNG 120 to classify all the subscriber traffic according to a personalized QoS profile. Per class of service dedicated hardware queues and HW policers can be allocated to each instantiated subscriber along with a (hierarchical) scheduler. The scheduler and the dedicated queues allow the WiFi service to evolve from best-effort, to QoS-enabled IP services, also supporting real-time voice and video applications.
- Security: The secure access towards the eBNG 120 is complemented with a set of security features in the eBNG 120. Those include customer profile based access control lists and anti-spoofing protection. Anti-spoofing filters are used to prevent end-subscribers from attacking other subscribers or trying to impersonate other subscribers by spoofing IP and MAC addresses.
- VPRN: VPRN instantiation in the eBNG 120 can be used for service virtualization in a wholesale context or can be used to offer secured business VPN access. The VPRN-id will therefore point to the retailer VPN or to the business customer VPN.
- NAT: In order to preserve IPv4 address space, Network Address and Port Translation (NAPT) can be configured on the eBNG 120. Each new subscriber NAPT context is instantiated dynamically.
- Local content insertion: When the eBNG 120 is already integrated with a local content insertion point of the fixed CDN network, the Wi-Fi offload traffic can also take advantage of this cached content. This will reduce the number of hops the traffic traverses and the cost it generates, and increase the content availability and responsiveness toward the end-user.

Charging integration can be achieved by providing the Wi-Fi offload charging records from the eBNG 120 to the mobile billing support system (BSS). Especially when the eBNG 120 is owned by the mobile operator this charging integration, both for offline and online charging, can allow a first step in the Wi-Fi offload service introduction. It reduces the integration of both networks to only the AAA and charging interfaces integration. The data plane of the Wi-Fi offloaded traffic does not need to go through the mobile network and can be offloaded straight to the internet.

The same infrastructure can also be opened up to support open access (without IEEE 802.1X) and portal authentication. In that scenario, the eBNG 120 allows an unauthenticated device to start a DHCP session, but will redirect any http traffic towards a landing page. Any non-http traffic is discarded. This is achieved through a Redirect-Policy the eBNG 120 obtained from the AAA server 150.

When the user has completed the portal registration and is authorized, the user profile is updated in the eBNG 120 to give the user full data access. This is done through a RADIUS CoA update from the AAA server 150.

Further integration of the eBNG 120 towards the mobile packet core is achieved through GTP encapsulation of the offloaded traffic, for it to be handed off on a GTP based S2b-like interface towards the PGW or GGSN. GTP encapsulation in the eBNG 120 allows the operator to have the same anchor point for both 3G-LTE and Wi-Fi offloaded traffic. It allows the end user to roam between cellular and non-cellular IP CAN while maintaining its IP address and it allows native access to the mobile data service infrastructure. It allows the mobile operator to re-use its entire service infrastructure on the PGW-GGSN not only in terms of charging, but also for mobile content, internet access, Deep packet inspection, video optimization, header enrichment etc.

Authentication and authorization are fully aligned with the stand-alone eBNG 120 with optional embedded RADIUS proxy agent described above. However, the eBNG 120 now responds to the DHCP discovery message by creating an EPS session or PDP context to the PGW-GGSN. The UE IP address is then chosen by the PGW from its local pools or a pre-existing EPS-session or PDP context.

In the data plane, the eBNG 120 optionally performs a LAC-like function: in the upstream, it GTP-encapsulates all the traffic from the sessions in the IPsec fat pipe and forwards that traffic to the PGW-GGSN; in the downstream, it terminates the GTP-encapsulated traffic received from the PGW-GGSN and forwards the traffic to the correct IPsec tunnel towards the correct wireless access point.

In order to preserve the UE IP address between the cellular IP CAN session and the non-cellular IP CAN session, the eBNG 120 creates an EPS session at the PGW-GGSN with hand-over indication. This hand-over indication will force the PGW-GGSN to verify whether an existing EPS session or PDP context is ongoing for the user entity, and retrieve the context of that session. As a result, the PGW-GGSN will allocate the existing IP address to the non-cellular session and will send a session disconnect to the SGW/MME or Gn/Gp SGSN.

There is the need to make a separation between primary private use of the access point 110 and the use of available excess bandwidth for public use.

This may be achieved by providing two SSIDs on the Access Point. All traffic over the private SSID is aggregated as fixed access and also accounted as such. For the traffic over the public SSID a dedicated connection needs to be set up (possibly over a dedicated VLAN or tunnel) so that this traffic can be treated independently and accounted for independently.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for providing packet data network (PDN) access to a user entity (UE) via a PDN gateway of a mobile packet core network, the method comprising:
   forwarding, by a gateway device, to said PDN gateway, encapsulated in a general packet radio service tunneling protocol (GTP) tunnel between said gateway device and said PDN gateway, session traffic of a user entity from a layer-2 communication link between said user entity and said gateway device via an access point of a wireless local area network (LAN);
   providing, by said gateway device, charging data in regard to said session traffic; receiving, by said gateway device, an IP address allocation request from said UE via said layer-2 communication link;
   verifying, by said gateway device, whether a successful authentication of said UE on the basis of subscription data related to a mobile subscription associated with said UE has taken place; and
   upon successful verification, completing, by said gateway device, an IP address allocation scheme with said UE to allow communication between said UE and said PDN.

2. The method of claim 1, wherein said authentication includes authentication that takes place at set up of a communication link between said UE and said access point.

3. The method of claim 1, further comprising allowing subscriber profile information associated with said UE to be made available to said gateway device during said authentication of said UE.

4. The method of claim 1, further comprising:
   setting-up, by said gateway device, said GTP tunnel to said PDN gateway.

5. The method of claim 1, further comprising:
   forcing, by said gateway device, the PDN gateway, via a handover indication, to allocate an existing IP address to preserve an IP address of the UE in case of handover.

6. A non-transient computer readable medium carrying computer instructions configured to cause an associated programmable machine to carry out the method of claim 1.

7. A gateway device, comprising: at least one processor; and at least one memory storing instructions that, when executed by the at least one processor, cause the gateway device to: forward to a packet data network (PDN) gateway of a mobile packet core network, encapsulated in a general packet radio service tunneling protocol (GTP) tunnel between said gateway device and said PDN gateway, session traffic of a user entity from a layer-2 communication link between said user entity and said gateway device via an access point of a wireless local area network (LAN); provide charging data in regard to said session traffic; receive an IP address allocation request from said UE via said layer-2 communication link; verify whether a successful authentication of said UE on the basis of subscription data related to a mobile subscription associated with said UE has taken place; and upon successful verification, complete an IP address allocation scheme with said UE to avow communication between said UE and said PDN.

8. The gateway device of claim 7, wherein said authentication includes authentication that takes place at set up of a layer-2 communication link between said UE and said access point.

9. The gateway device of claim 7, said at least one memory storing instructions that, when executed by the at least one processor, cause the gateway device to allow creating awareness of subscriber profile information associated with said UE at said gateway device during authentication of said UE.

10. The gateway device of claim 7, wherein said at least one memory storing instructions that, when executed by the at least one processor, cause the gateway device to:
    set up said GTP tunnel to said PDN gateway.

11. The gateway device of claim 7, wherein said at least one memory storing instructions that, when executed by the at least one processor, cause the gateway device to:
    force said PDN gateway, via a handover indication, to allocate an existing IP address to preserve a UE IP address in case of handover.

12. The method of claim 1 wherein said encapsulated session traffic is encapsulated by said gateway device and forwarded by said gateway device to said PDN gateway.

13. The gateway device of claim 7 wherein said at least one memory stores instructions that, when executed by the at least one processor, cause the gateway device to:
    encapsulate said session traffic into said general packet radio service tunneling protocol (GTP) tunnel.

* * * * *